(12) United States Patent
Ou

(10) Patent No.: US 8,111,792 B2
(45) Date of Patent: Feb. 7, 2012

(54) APPARATUS AND METHODS FOR DIGITAL ADAPTIVE EQUALIZER IN SERIAL RECEIVER

(75) Inventor: Chiung-Ting Ou, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 245 days.

(21) Appl. No.: 12/633,533

(22) Filed: Dec. 8, 2009

(65) Prior Publication Data

US 2010/0246657 A1    Sep. 30, 2010

Related U.S. Application Data

(60) Provisional application No. 61/163,985, filed on Mar. 27, 2009.

(51) Int. Cl.
*H04B 1/10* (2006.01)
(52) U.S. Cl. ......... 375/350; 375/229; 375/316; 375/326
(58) Field of Classification Search .................. 375/229, 375/316, 326, 350
See application file for complete search history.

(56) References Cited

U.S. PATENT DOCUMENTS

| | | | |
|---|---|---|---|
| 7,184,478 B2 * | 2/2007 | Popescu et al. | 375/233 |
| 7,738,620 B2 * | 6/2010 | Barberis et al. | 376/409 |
| 7,961,817 B2 * | 6/2011 | Dong et al. | 375/317 |

OTHER PUBLICATIONS

Lee, M.-J. E., et al.; "Low-Power Area-Efficient High-Speed I/O Circuit Techniques"; IEEE Journal of Solid-State Circuits, vol. 35, Issue 11; Nov. 2000, pp. 1591-1599.

* cited by examiner

*Primary Examiner* — Ted Wang
(74) *Attorney, Agent, or Firm* — Slater & Matsil, L.L.P.

(57) ABSTRACT

Circuits and methods for performing adaptive frequency compensation in a serial receiver coupled to a differential signal channel link are disclosed. In an exemplary embodiment, a receiver for signals over a serial channel link is provided including a linear equalization function. A data recovery circuit is coupled to the output of the receiver and receives frequency compensated analog signals. A digital feedback control circuit observes the digital output. A data accumulator circuit receives the output of a comparator and a signal indicating the data pattern observed in the digital data output. A digital filter receives the accumulator data and outputs control signals for modifying the linear equalization in a feedback loop. The receiver and linear equalization function are automatically and adaptively modified to provide frequency compensation. Methods for adaptively modifying the frequency response of a receiver and linear equalizer using digital feedback are disclosed.

20 Claims, 22 Drawing Sheets

US 8,111,792 B2

APPARATUS AND METHODS FOR DIGITAL ADAPTIVE EQUALIZER IN SERIAL RECEIVER

This application claims the benefit of U.S. Provisional Application No. 61/163,985, entitled "Apparatus and Methods for Digital Adaptive Equalizer in Serial Receiver," filed on Mar. 27, 2009, which is incorporated herein by reference.

TECHNICAL FIELD

The present invention relates to a circuit and methods for providing an improved integrated circuit design and methods for providing a receiver for a differential input signal. The use of serial-deserial (SerDes) data links is well known in the art, where digital data is transformed into a serial data stream, clocked, converted to an analog signal, transmitted using a differential signaling channel link, received as an analog signal by a receiver, the clock information is retrieved and the self clocked digital data stream is received. A serial to parallel converter then outputs the digital data for use in the receiving device. The channel has significant signal losses, especially at higher frequencies. A linear equalizer is therefore used in the receiver to compensate for channel losses. The embodiments of the present invention provide advantages in implementing such receivers with linear equalizers in integrated circuits that are used with a variety of transmitters and channels.

BACKGROUND

Presently, receivers for differential signals are implemented in integrated circuitry using analog circuits. FIG. 1 depicts, for example, a system diagram of a typical prior art transmitter device 11 coupled to a link channel 13 for sending differential signals to a receiver 15. The receiver may be implemented as a receiver and analog front end (RXAFE) in an integrated circuit, or on a circuit board, or in multiple integrated circuits. The receiver extracts the received data from the analog differential signals and after some processing, received digital data signals may be output by the receiver. The data may be transmitted over a SerDes link using self clocking techniques as is known in the art.

When an analog receiver circuit is part of an integrated circuit, changing the parameters of the analog components used in the receiver becomes difficult. Some known prior art approaches employ external components to compensate the frequency response of the receiver for different channels and transmitters. Some known approaches may include trimming of on-chip resistors and the like. None of these trimming or tuning approaches is adaptive to later changes in the system. That is, if the receiver integrated circuit is later coupled to a different channel link or to a different transmitter, or to a channel that has time varying characteristics, the prior art integrated receiver may then be optimized for the wrong environment.

FIG. 2(A) depicts an example frequency response curve for the channel link. As is known to those skilled in the art, signal losses occur in a transmission channel which results in a gain loss (magnitude falls) in the signal, especially above certain frequencies. These losses may be due to several factors, including without limitation skin effects, dielectric coupling losses, and other transmission losses. The total channel loss appears similar to the frequency response of a low pass filter. In order to compensate the received signals for losses in the channel, the receiver should act as a high pass filter (in terms of frequency response). FIG. 2(B) depicts the desired frequency response of a receiver coupled to the channel. By providing gain at the correct frequencies, the receiver can compensate the signals received for the channel losses and restore them to the original magnitude at the transmitter. Thus, a desired receiver frequency response is matched to and compensates the channel losses in the channel frequency response. The desired total frequency response of the channel and the receiver is one of flat loss and bandwidth extension.

FIG. 3 depicts an example combined frequency response for the channel response in FIG. 2(A) and the receiver response in FIG. 2(B). The magnitude stays constant across the frequency range (flat loss) and the channel loss effect has been compensated, maintaining the signal magnitude at the higher frequencies where channel loss would otherwise occur (bandwidth extension).

The receiver frequency response is dictated by the linear equalizer function (LEQ) within the receiver analog front end (RXAFE) circuit. The LEQ should ideally be matched to the channel frequency response. This concept is illustrated by the curves in FIG. 4. In the top graph illustrating three curves labeled "channel 1", "channel 2" and "channel 3", the frequency responses for three different channels that the receiver circuit and analog front end circuitry RXAFE could be coupled to are shown. Each channel has different channel loss characteristics. In the bottom graph, the receiver LEQ frequency responses needed to compensate each of these three channels is shown. If the receiver is to operate with a variety of channel conditions, the LEQ should be adaptive so as to compensate for different loss characteristics in the channel or for different channels.

An LEQ frequency response has at least 3 important components, as illustrated by the response curve in FIG. 5. The gain peak frequency Fgp is one objective characteristic and represents the frequency where the most receiver gain is obtained In order to compensate for channel loss, this should correlate to the frequency that causes channel loss in the channel frequency response. The Gmax characteristic indicates the maximum gain needed in the receiver including the LEQ. The deltaG characteristic is the difference in gain needed between the high and low frequency receiver responses. Typically at lower frequency, the channel losses are not significant and thus the receiver does not need to have gain for those portions of the received signal.

A prior art approach to providing a receiver function is shown in FIG. 6. The channel 13 is depicted coupled to a receiver function 60. This receiver function may be one or more integrated circuits on a circuit board, discrete circuitry, or increasingly the receiver function may be part of an ASIC or SOC integrated circuit that includes other functions such as signal processors and the like. The receiver front end 63 includes an analog receiver and linear equalizer function as is known in the prior art. The analog signals are then transmitted in pairs to the clock and data recovery block 65 which includes, without limitation, an analog to digital converter, clock recovery circuitry. The recovered serial data stream is then converted into parallel data words by the series input parallel output circuit (SIPO) 67, which may be implemented as a FIFO, circular buffer, shift register, or other digital logic circuit known in the art.

The inputs to the receiver front end 63 are labeled (1), (2) and (3) and represent an input for altering the three characteristics described above, that is, the peak gain frequency Fgp, the maximum signal gain Gmax, and the gain difference deltaG. These inputs must be provided by external circuitry or additional internal circuitry. These inputs in the prior art are chosen with respect to the channel frequency response through a tuning or calibration procedure, for example, and are fixed. If the channel response varies with temperature, or other variations occur, or if the receiver device is coupled to a different channel, the circuitry driving these inputs should be changed, otherwise the response of the receiver LEQ is no longer able to compensate for the channel losses.

The increasing trend of the use of integrated circuitry in forming analog receivers for serial differential channel communications increases the need for receivers that adaptively adjust to provide the correct compensation.

Thus, there is a continuing need for improved methods and circuits to address these and other problems with the receivers of the prior art.

SUMMARY OF THE INVENTION

These and other problems are generally solved or circumvented, and technical advantages are generally achieved, by embodiments of the present invention, which provides a receiver that adaptively provides linear equalization for signals received from a differential channel link; and methods for automatically compensating for changes in the channel frequency response without the need for additional calibration or tuning. The receiver incorporates a digital feedback function to provide automatic and adaptive operation.

In a first exemplary embodiment of the invention, a receiver for receiving differential signals over a serial channel link is provided. The receiver includes a linear equalization function. A data recovery circuit is coupled to the output of the receiver and receives frequency compensated analog signals. Analog to digital conversion and clock recovery is performed and a digital output signal is obtained. Serial to parallel conversion to output a parallel data signal is performed. A digital feedback control circuit observes the data output. At least one amplitude comparator is coupled to the output of the linear equalization function. A data accumulator circuit receives the output of the comparator and a signal that is an indication of a data pattern observed in the digital data output. A digital filter receives the accumulator data and outputs control signals for modifying the linear equalization in a feedback loop. The receiver and linear equalization function are automatically and adaptively modified to provide frequency compensation for signal loss in the channel link.

In a method, differential signals are received over a serial channel link and linear equalization is performed to output frequency compensated analog signals. Analog to digital conversion is performed on the analog signals and digital data and clocking signals are recovered. Amplitude comparison is performed to determine if the analog signal magnitude exceeds at least one predetermined threshold. Digital feedback signals are output by a digital filtering process to adjust characteristics of the linear equalization and provide an adaptive and automatic frequency compensation method.

The foregoing has outlined rather broadly the features and technical advantages of the present invention in order that the detailed description of the invention that follows may be better understood. This summary section briefly describes certain exemplary embodiments of the invention but the invention is not limited only to these exemplary embodiments.

Additional features and advantages of the invention will be described hereinafter, which form the subject of the claims of the invention. It should be appreciated by those skilled in the art that the conception and specific embodiment disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

The drawings, schematics and diagrams are illustrative, not intended to be limiting but are examples of embodiments of the invention, are simplified for explanatory purposes, and are not drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
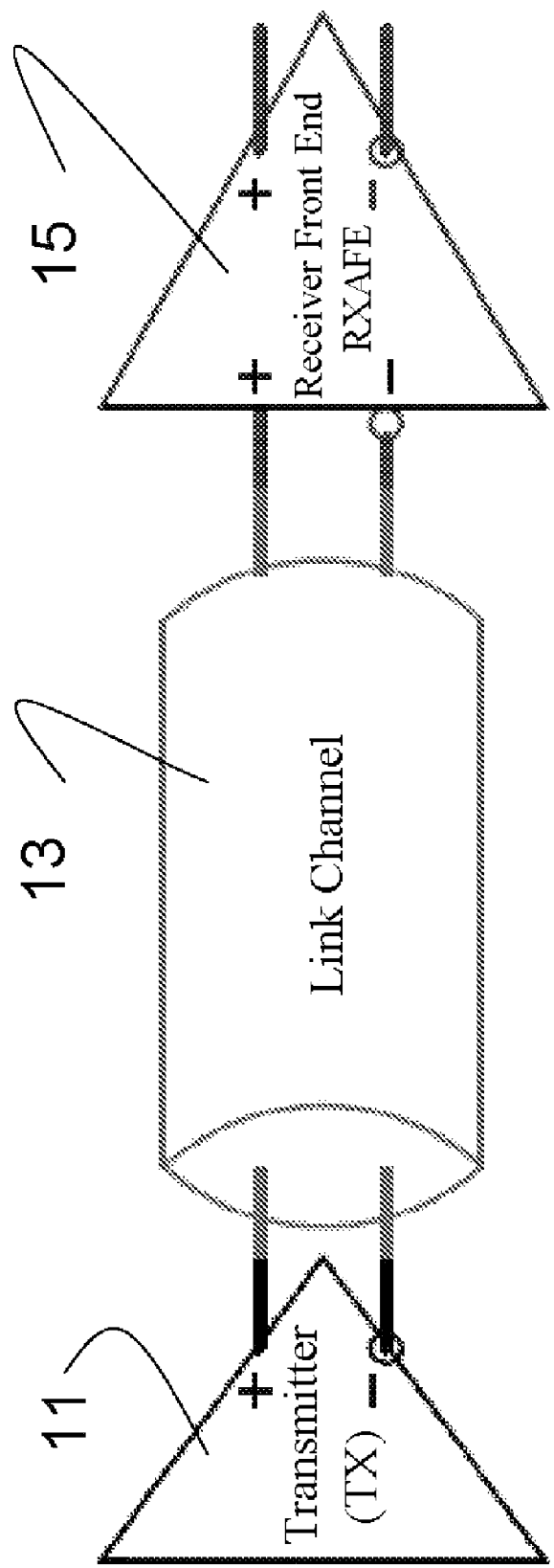
FIG. 1 illustrates a receiver, transmitter and link channel of the prior art.
Figures 2A, 2B:
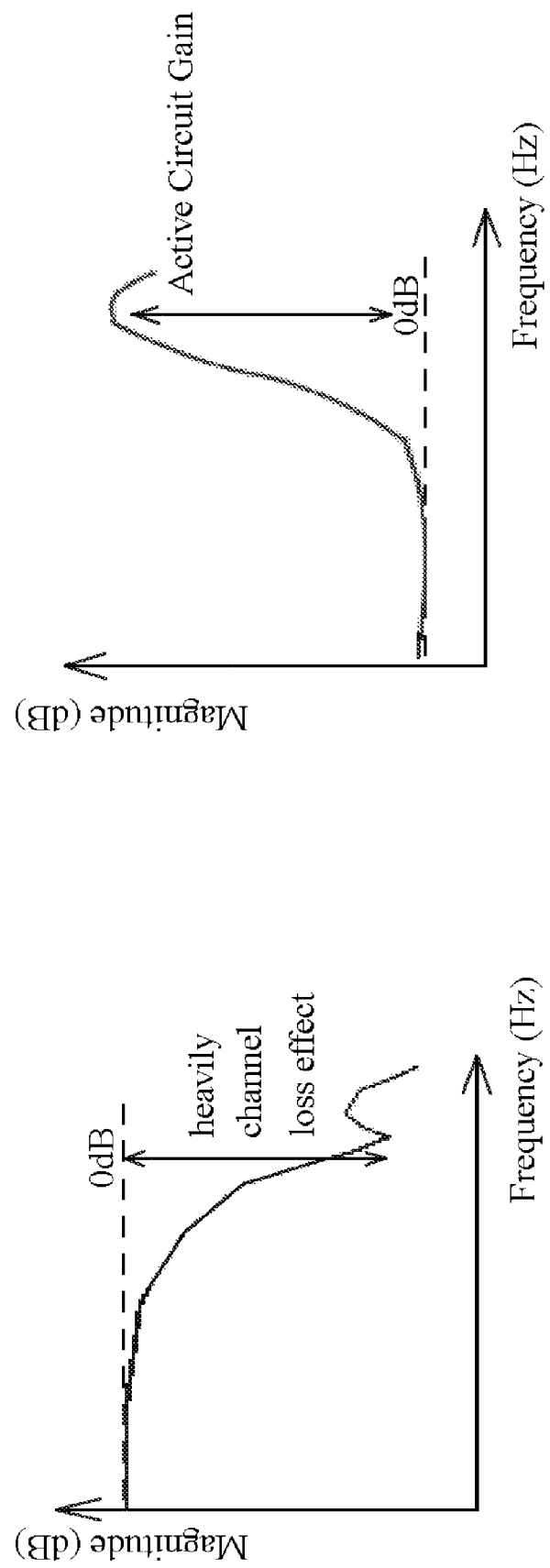
FIG. 2(A) illustrates a channel frequency response graph of the prior art and FIG. 2(B) illustrates a receiver frequency response of the prior art.
Figure 3:
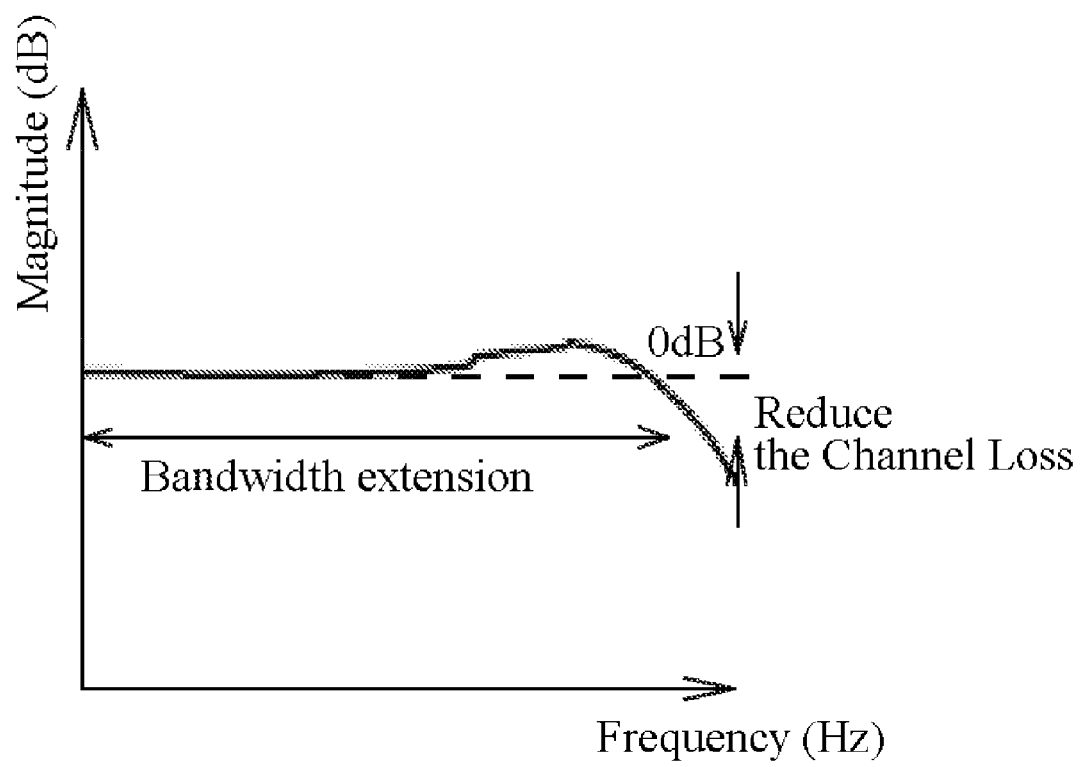
FIG. 3 illustrates a combined frequency response graph for the receiver and the channel of FIGS. 2(A) and 2(B)
Figure 4:
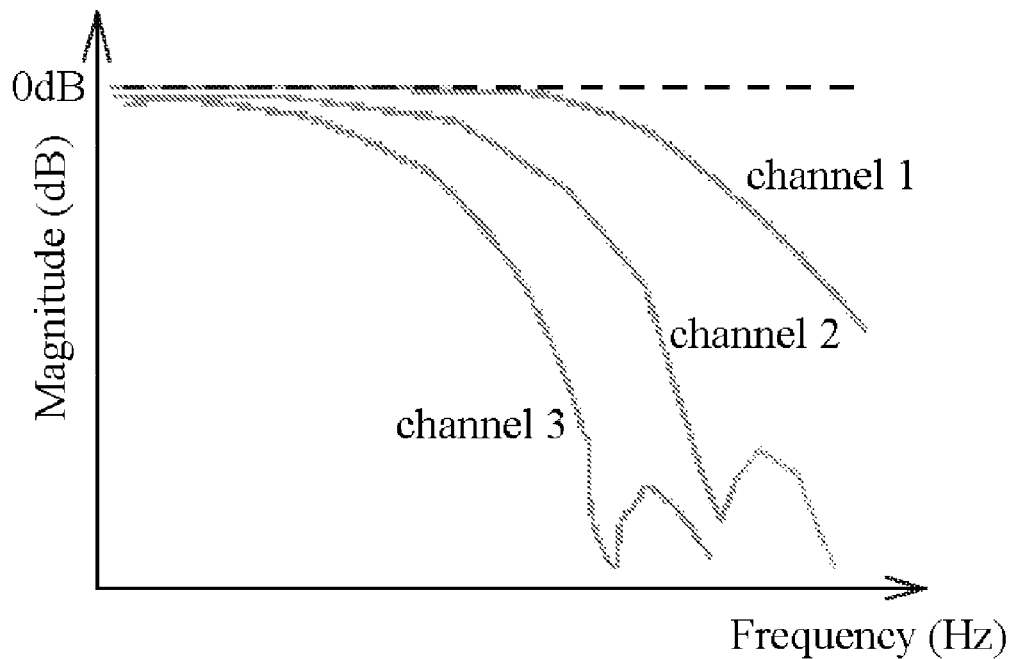
FIG. 4 illustrates the frequency response curves for three channel conditions and the desired frequency response of a linear equalizer for the three channel conditions.
Figure 4:
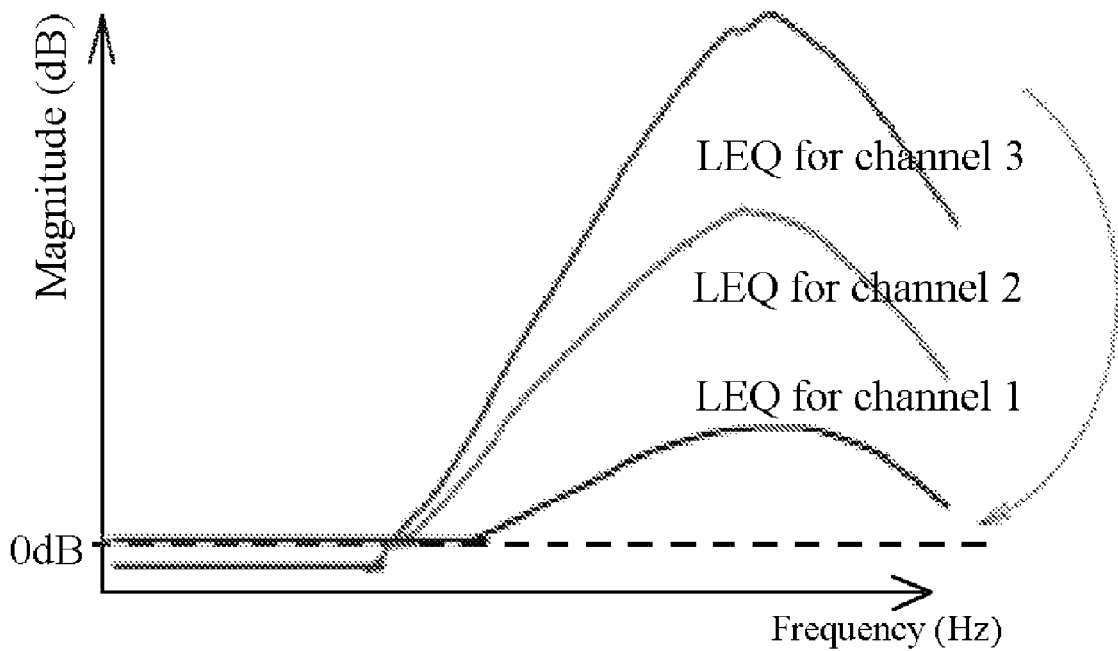
Figure 5:
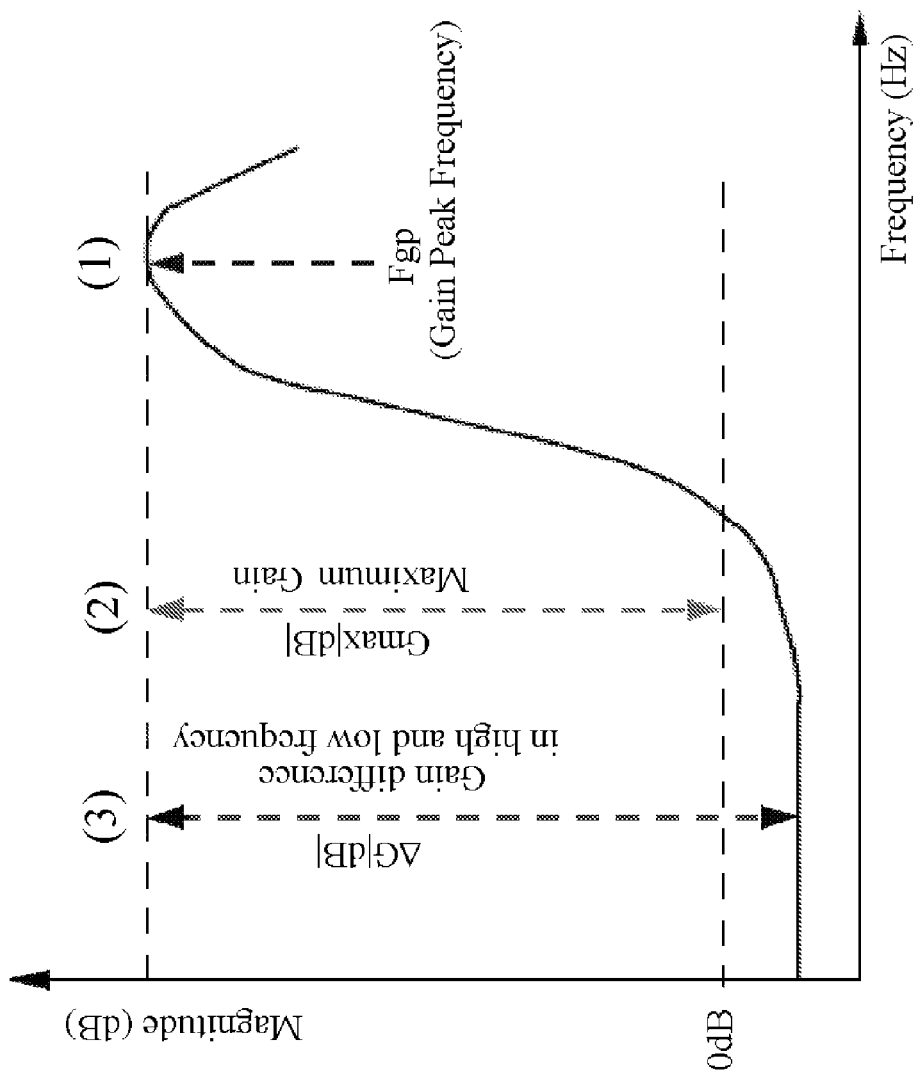
FIG. 5 illustrates in detail a channel frequency response curve for a linear equalizer of the prior art.
Figure 6:
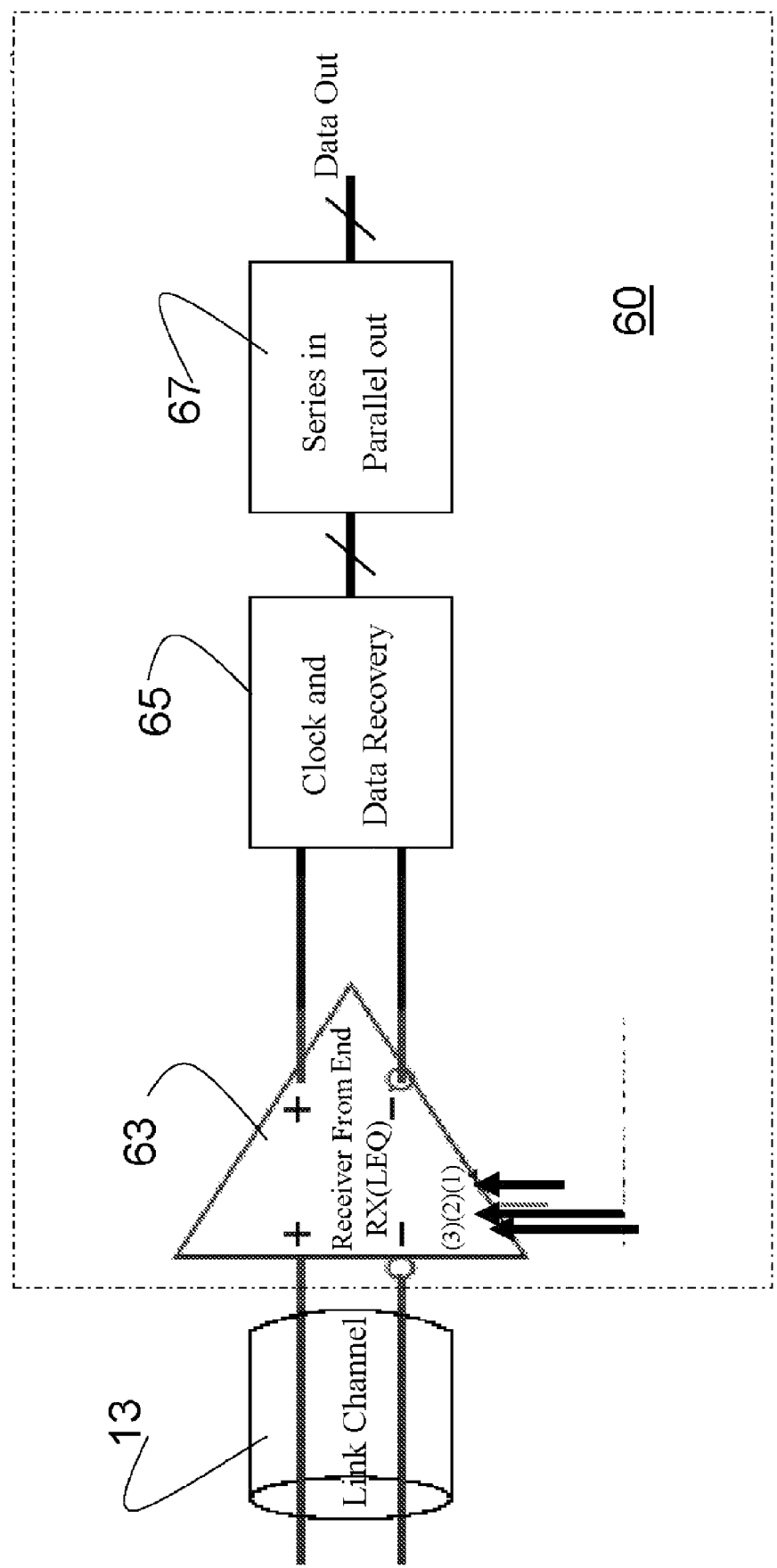
FIG. 6 illustrates a receiver and associated circuitry in a block diagram of a prior art solution.
Figure 7:
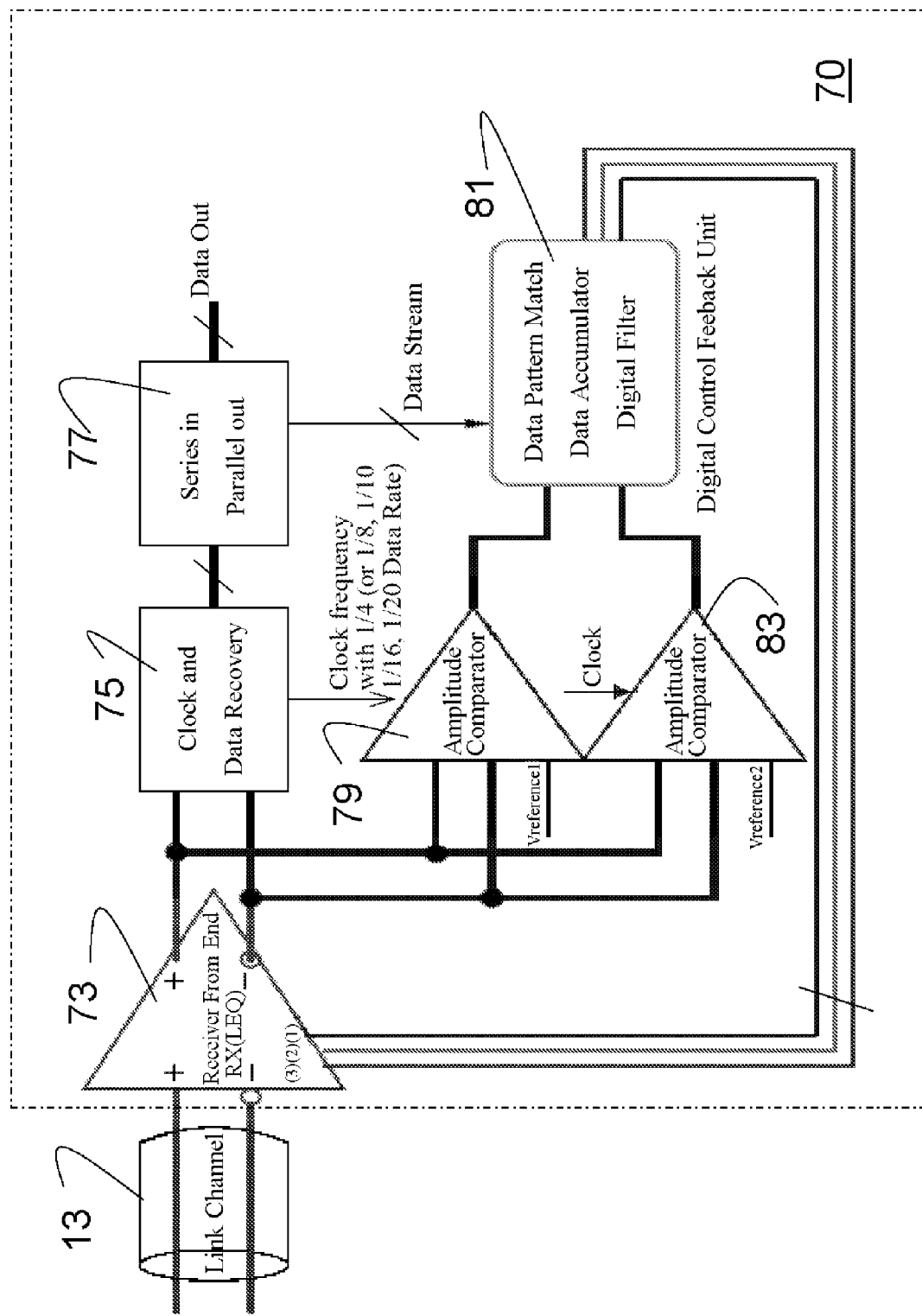
FIG. 7 illustrates in a block diagram an exemplary embodiment of a receiver of the present invention.

FIG. 7 depicts an exemplary embodiment of a receiver circuit incorporating features of the present invention. Receiver 70 may be implemented, for example, as an integrated circuit using ASIC, SOC or custom design techniques as a portion of a larger integrated circuit incorporating additional features and circuitry; for example, in a transceiver or system solution integrated circuit, or as a circuit board incorporating several integrated circuits or discrete circuits. Each of these alternative implementations is contemplated as part of the embodiments and falls within the scope of the appended claims. Partitioning of certain portions of receiver 70 into digital integrated circuits, analog integrated circuits, software and programmable processors, using embedded memory and other design techniques is within the scope of the appended claims. A mixed signal integrated circuit may be used to implement receiver 70. Mixed signal integrated circuits may be fabricated using semiconductor processes with devices optimized for analog functions such as analog receivers, operational amplifiers, and the like, and with additional devices optimized for digital functions such as digital logic, digital filters, digital processors and the like. These different devices may then be disposed on a single piece of silicon as an integrated circuit. A multichip packaging approach could be used where a single device or module is formed containing analog and digital integrated circuits coupled together to form receiver 70.

Receiver 70 comprises at least the receiver front end 73 including a linear equalizer LEQ, two amplitude comparators 79 and 83 described further below, a clock and data recovery block 75 including analog to digital conversion, clock recovery, digital error correction and digital filtering, a SIPO 77 to convert the recovered serial data received to parallel form, and a digital control feedback unit 81. The digital control feedback unit 81 performs a data pattern match, data accumulation, and digital filter function and outputs at least three feedback signals. The three feedback signals control the receiver LEQ 73 by providing inputs to change the gain peak frequency Fgp, the maximum gain Gmax, and the gain difference deltaG, and thereby these control signals may then adaptively change the high pass filter frequency response of the LEQ 73 as the channel frequency response changes.

The receiver circuit 70 may be integrated with additional functions or user specified circuitry such as digital logic circuitry, digital signal processors, data buffering, embedded memory and the like. Typically, functions needed for receivers, transmitters and transceivers may be integrated together. In one non-limiting example, a decision equalizer is integrated with the receiver 70 onto a single integrated circuit. Entire systems for cell phones or other transceivers may also be integrated into a single device or integrated circuit incorporating the example receiver embodiment of FIG. 7.

Figure 8:
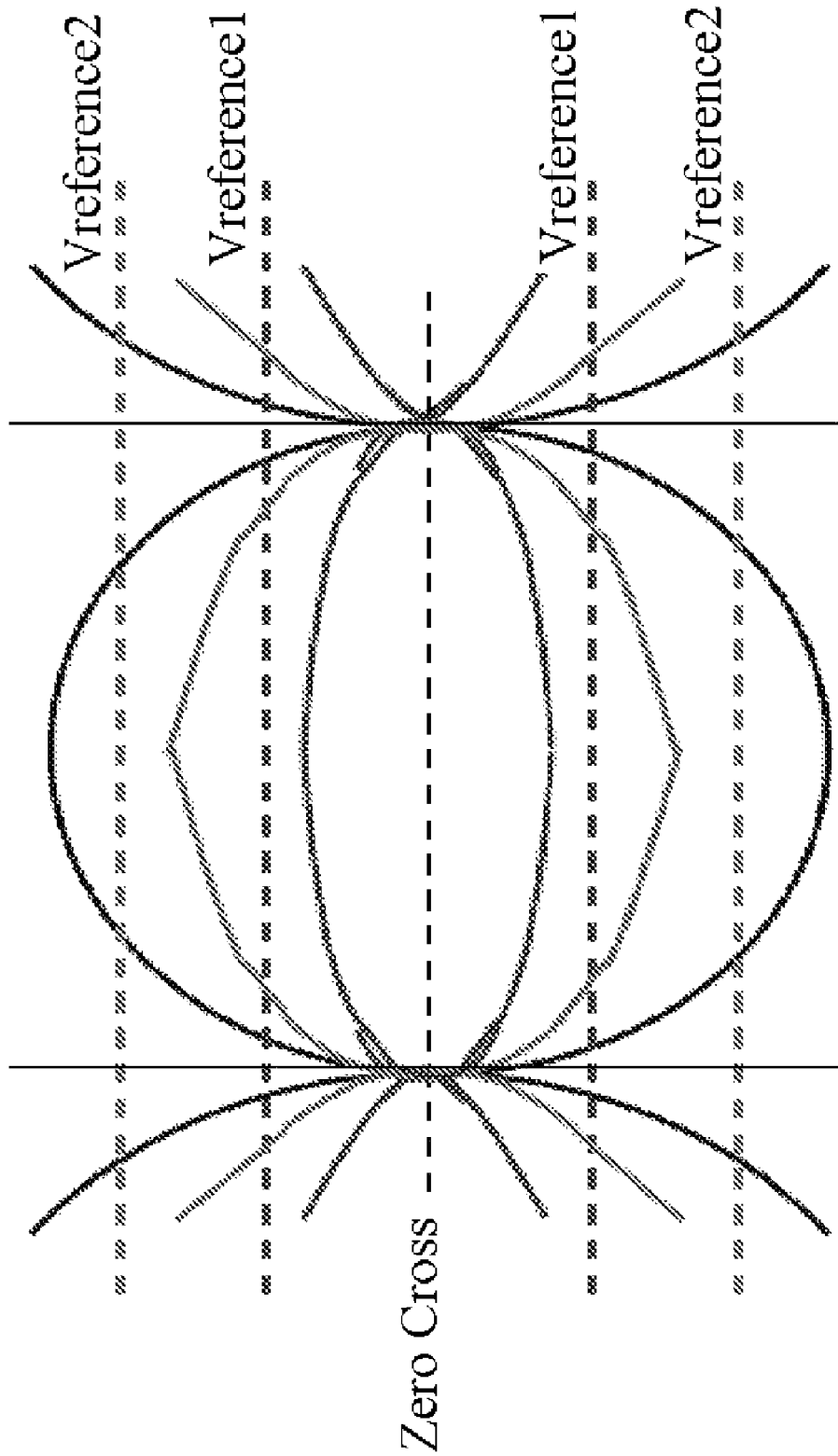
FIG. 8 depicts in a voltage time diagram three signal eye conditions.

FIG. 8 depicts in a simple timing diagram the operation of the signal amplitude comparators 79 and 83 of FIG. 7. The comparators compare the magnitude of the differential signal outputs from the receiver front end 73 to one of two voltage references. Comparator 79 receives voltage reference Vreference1 in FIG. 7. Comparator 83 receives Vreference2. These amplitude comparators may be formed using known sample and hold analog comparator circuits such as the ones described by Lee et al., in a paper entitled "LOW-POWER AREA-EFFICIENT HIGH-SPEED I/O CIRCUIT TECHNIQUES, IEEE J. Solid-State Circuits, vol. 35, No. 11, 2000, pp. 1596; for a non-limiting example of a sample and hold circuit. Other known sample and hold comparators could also be used.

In FIG. 8, the magnitude of the signal eye formed over a zero crossing interval of the time varying input signal received is compared to these voltage references. When the receiver LEQ 73 is properly compensating received signals for the channel loss, the magnitude of the received signals will be greater than both the voltage thresholds Vreference1 and Vreference2. If the compensation is not sufficient, the magnitude may be greater than the lesser threshold but less than the greater threshold voltage. If the compensation in the receiver 73 is even less adequate, the magnitude of the received signal eye may be even lower than the lower threshold. The outputs of the two comparators are used to determine if a change is needed to the three feedback control signals to change the receiver LEQ 73 frequency response. In an alternative embodiment that requires less silicon, only one comparator and one voltage reference is used.

The comparator circuits may be operated at a sample frequency that is substantially lower than the data rate. For example, the comparator sample frequency may be as low as $\frac{1}{20}$th the data rate, or as high as $\frac{1}{2}$, $\frac{1}{4}$th, $\frac{1}{8}$th or $\frac{1}{16}$th the data rate. Lower frequency comparators are simpler to design and implement, use less power and less silicon area, and thus are advantageous. If, for a particular design application, power and area resource considerations permit, of course higher sample rate comparators could be used. Advantages of the embodiments are achieved even with lower frequency comparators. The comparator outputs provide a monitor of the channel and LEQ combined total frequency response. When the signal eye magnitude is high for a plurality of received signals, the receiver LEQ settings are good and the combined frequency response is meeting the desired goal of a flat loss and extended bandwidth for the particular channel conditions. When the signal eye has low magnitude, then the receiver LEQ needs to be adjusted. The low magnitude means that the combined frequency response is not optimized for the channel conditions.

Figure 9:
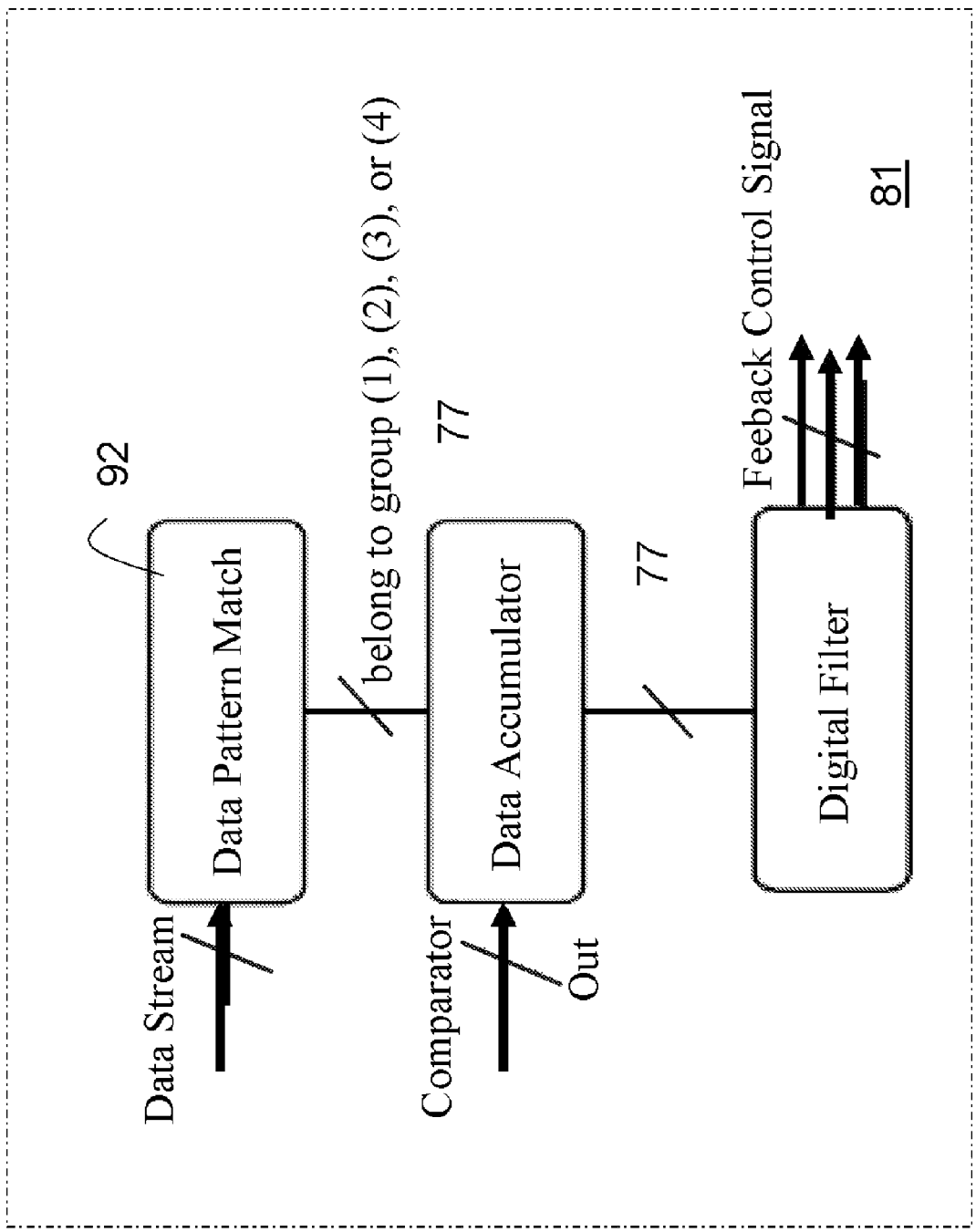
FIG. 9 depicts in a block diagram the digital feedback control unit of the embodiment of FIG. 7.

The outputs of the two comparators are coupled to the digital control feedback unit 81. FIG. 9 depicts the digital control feedback unit 81 in block diagram form. The digital control feedback unit 81 comprises three functional blocks. The data pattern match unit 92 receives the data stream from the SIPO circuit 77 and performs a data pattern matching function as further described below. The data pattern match unit provides m outputs Gr(m−1:0). A logical high or "1" in one of the bits in the group output Gr indicates which of four possible Group data patterns are detected by block 92. The group indication information Gr is received by the data accumulator 94. There are m accumulators in data accumulator 94. In the present example described for illustration, there are at least three data accumulators, one for each of the three feedback control functions. Each accumulator in the data accumulator 94 outputs an accumulator signal Ac that is k bits wide. In the exemplary illustrative embodiment described in detail here, one of the accumulators is directed to the peak gain frequency Fgp control signal; one is directed to the maximum gain Gmax control signal; and the third accumulator is directed to the deltaG gain difference control signal.

The Ac outputs of k bits wide of the three accumulators are then coupled to the digital filter function 96. The digital filter function is designed or programmed to generate the correct feedback control outputs for optimizing the LEQ frequency response in the receiver front end 73, based on the data accumulator outputs. The digital filter may be provided as a hardware function using circuitry, or alternatively as a program executed by a programmable digital processor such as a digital signal processor, or a combination of these may be used.

In operation, the three functions of the digital control feedback unit 81 work together to output the three feedback control signals in response to the observed signals from the receiver front end. In this adaptive feedback loop, the digital feedback control function will automatically modify the control signals to tailor the frequency response of the receiver LEQ 73 to compensate the overall channel frequency response and provide a combined frequency response with flat loss and extended bandwidth characteristics. Changes in the transmitter or channel, or changing the receiver to receive a different channel, are automatically compensated for by the digital control feedback unit.

Figure 10:
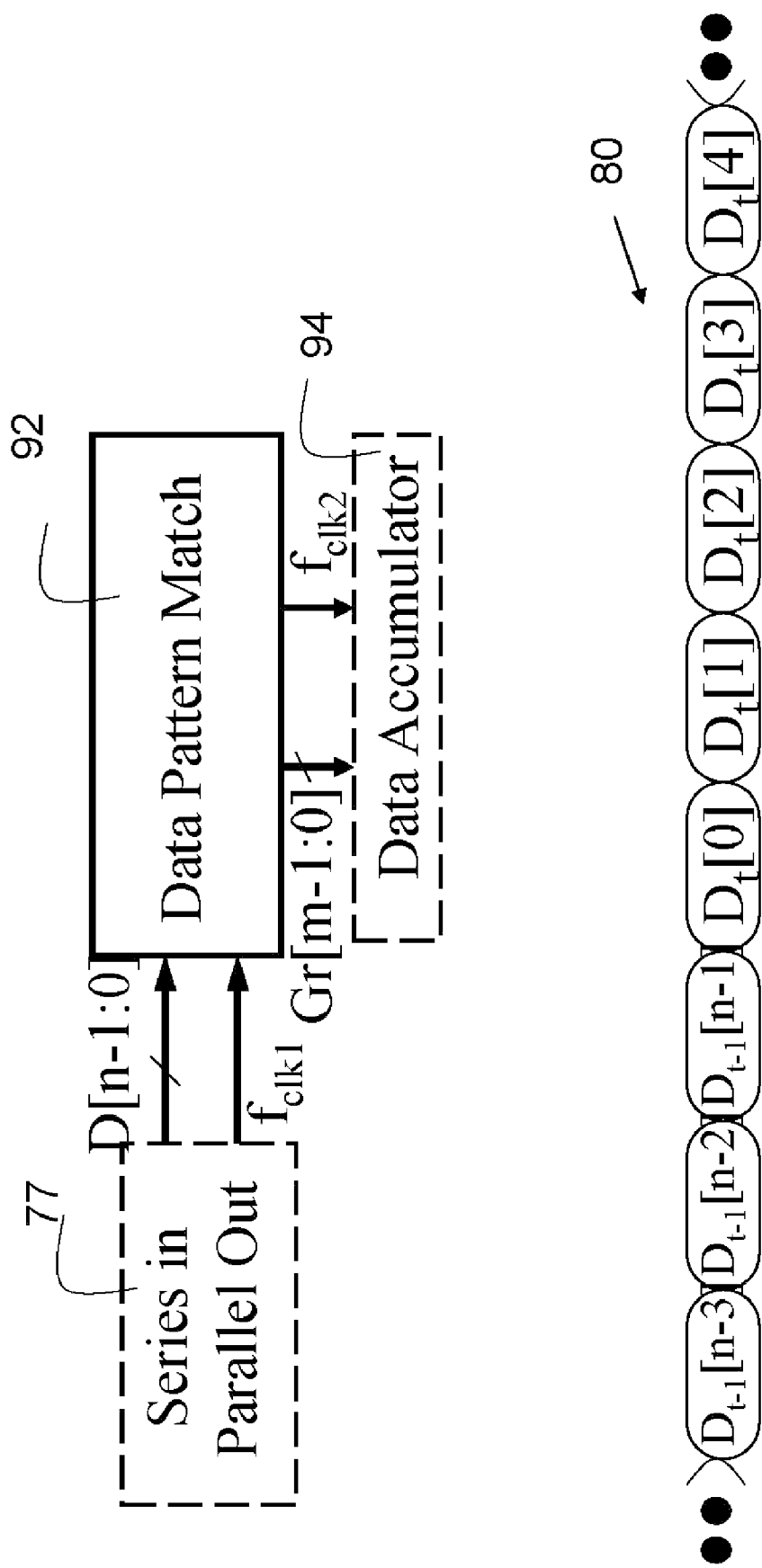
FIG. 10 depicts in a block diagram the function of the data pattern match unit of the digital feedback control unit of FIG. 9.

FIG. 10 depicts in a simple illustration the operation of one example of an implementation of the data pattern match function 92, which distinguishes four predetermined pattern groups from the received data stream. The order of the received data stream is shown at the bottom of the block diagram of FIG. 10 as timeline 80. The data D [n−1:0] at time "t" forms a parallel word Dt [0] . . . Dt [n−1]. The data received at time "t−1" forms a parallel word Dt-1[0] . . . Dt-1[n−1]. These parallel groups of serially received data are output by the SIPO unit, synchronized to the clock fclk1. The output data bus Gr[m−1:0] represents the current pattern match result, note that the clock fclk2 is the same rate as fclk 1. Gr[m−1:0] will be updated with the fclk1 clock rate.

Figure 11:
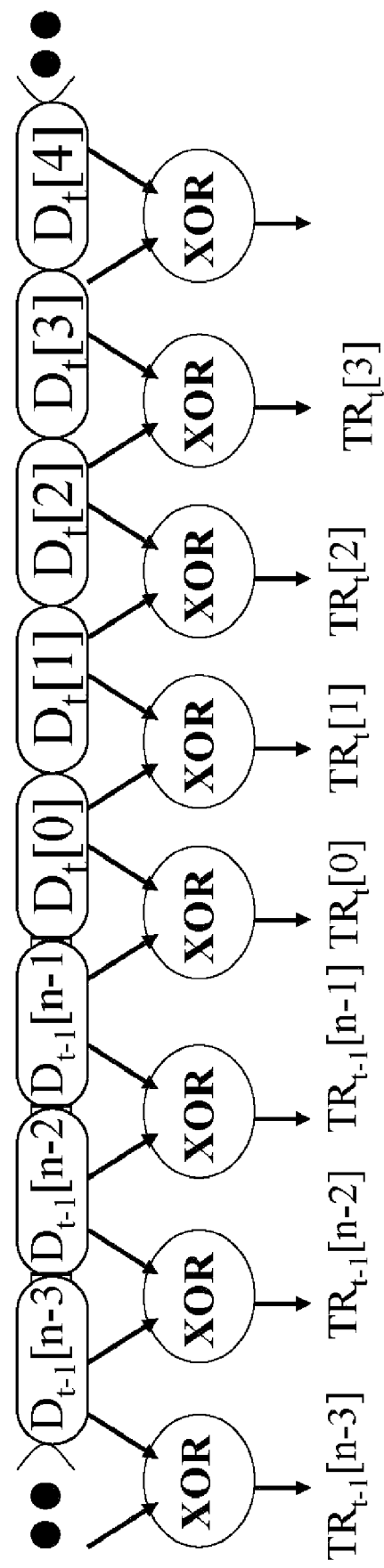
FIG. 11 depicts in a simple logic diagram a toggle detection function.

In operation the data pattern match function 92 first determines the toggle pattern in the data stream. FIG. 11 depicts one example implementation of a toggle pattern detector used data pattern match function 92. A plurality of one bit XOR functions are coupled in series and form a toggle result signal (TR) by comparing each data bit D to its nearest neighbors. In this manner, the existence of a change in data (toggle) from a one to a zero, or from a zero to a one, in the serial data stream as received by the SIPO can be determined as a toggle. Note that the toggle results TR is time indexed to match the data input.

Each one of four groups (in this illustrative example, four groups are used, but there could be more) corresponds to one or more predetermined data patterns in the data stream received by the SIPO. The data pattern match function 92 must determine, from the toggle results TR at a time "t", the group identifier. In one exemplary implementation, this information is output on the m bit wide group bus Gr[m−1:0] as an exclusive code, with only one bit in the Gr bus "set" or high. Other codes could be used.

Figure 12:
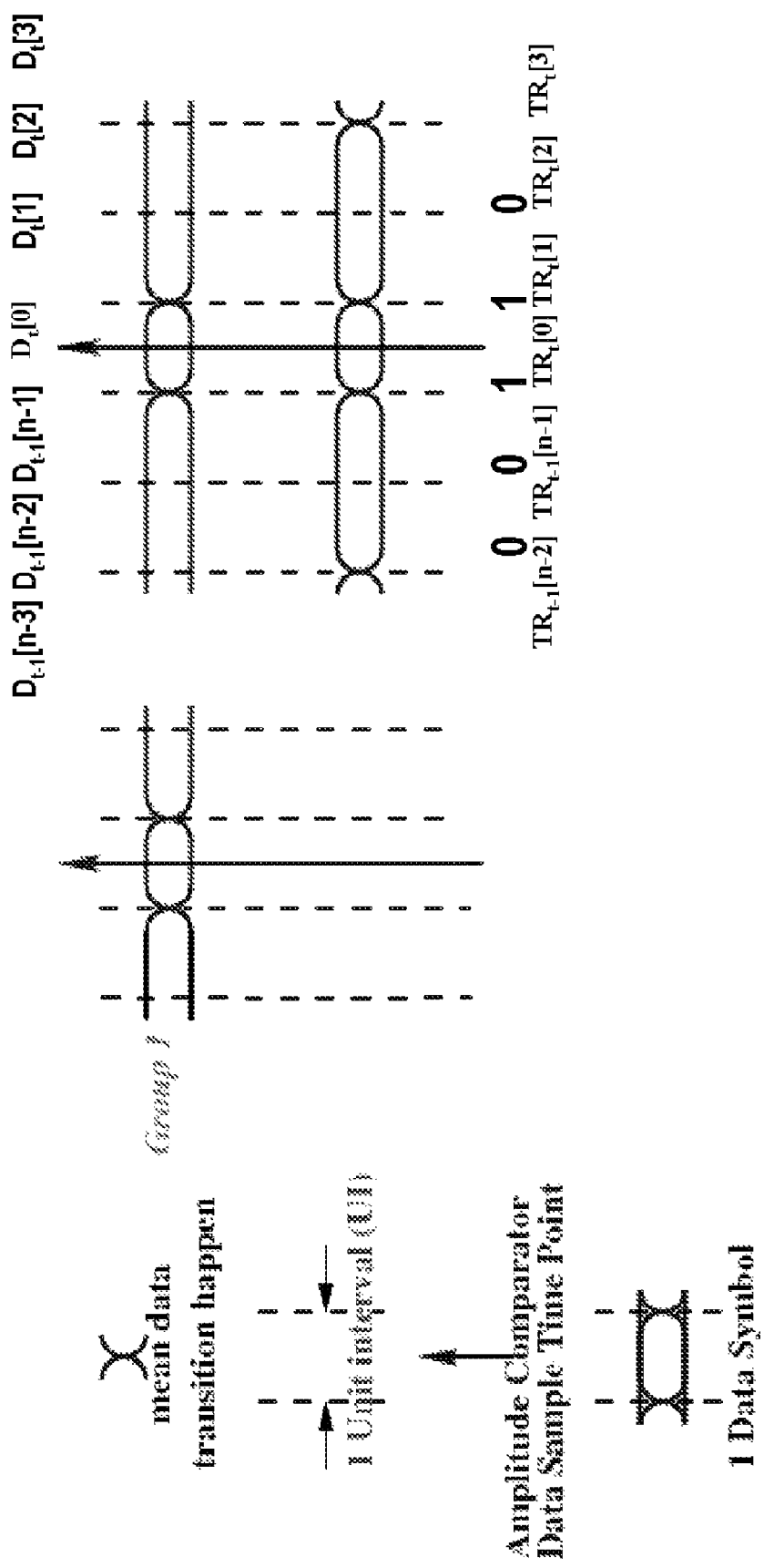
FIG. 12 depicts in a timing diagram data signal patterns that correspond to a first group indicator.
Figure 13:
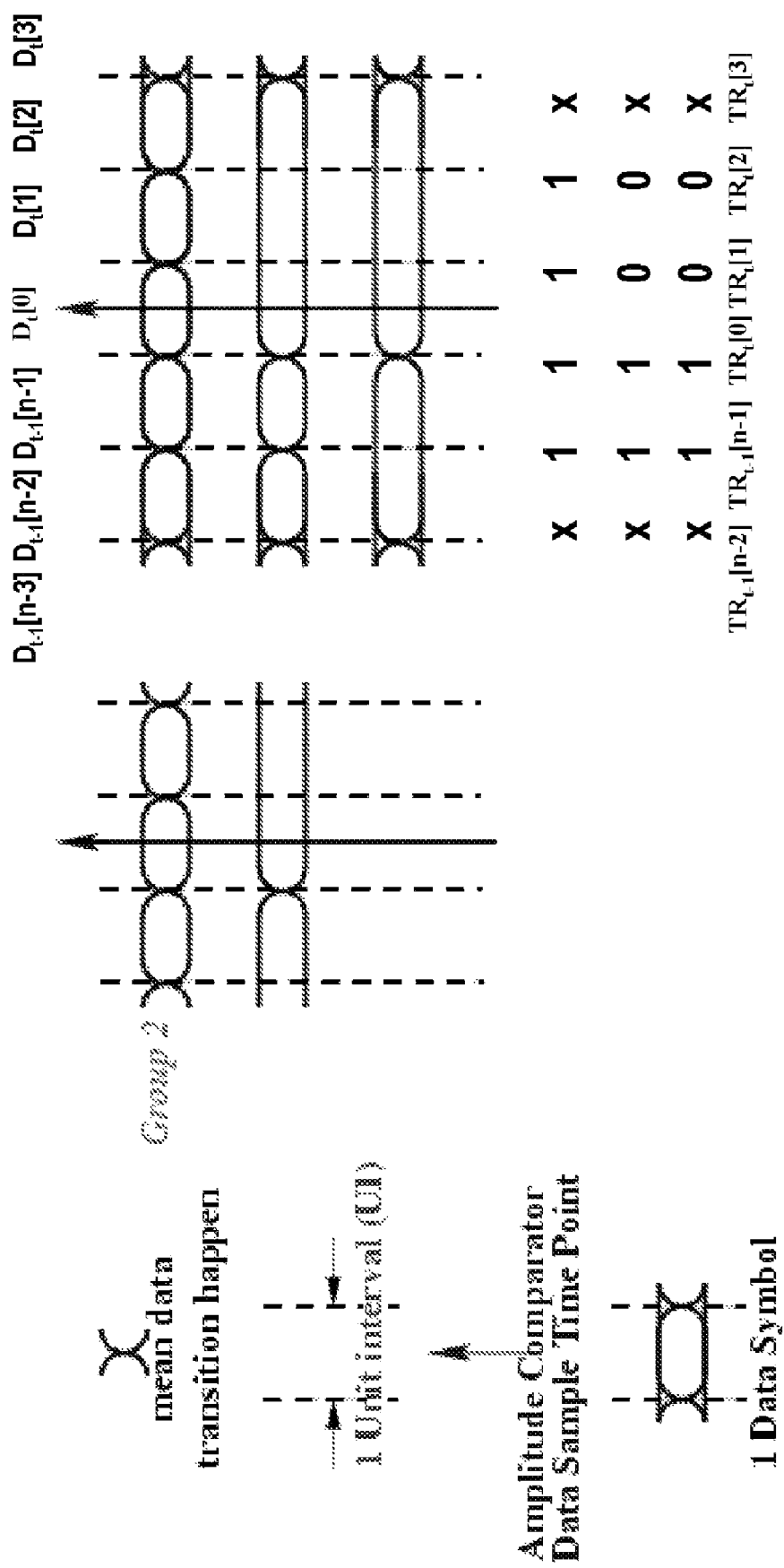
FIG. 13 depicts in a timing diagram data signal patterns that correspond to a second group indicator.

FIG. 12 depicts an example for a 'Group 1' pattern. In FIG. 12, toggle result TR is shown at the bottom of the figure. The pattern '00110 . . . ' in the TR fields TRt−1[n−2] . . . TRt[2] indicates a Group 1 pattern. In FIG. 13, patterns in the toggle result field TR that are 'x1111x', or 'x1100x', or 'x1100x' from TRt−1[n−2] . . . TRt[2] indicates a Group 2 pattern.

Figure 14:
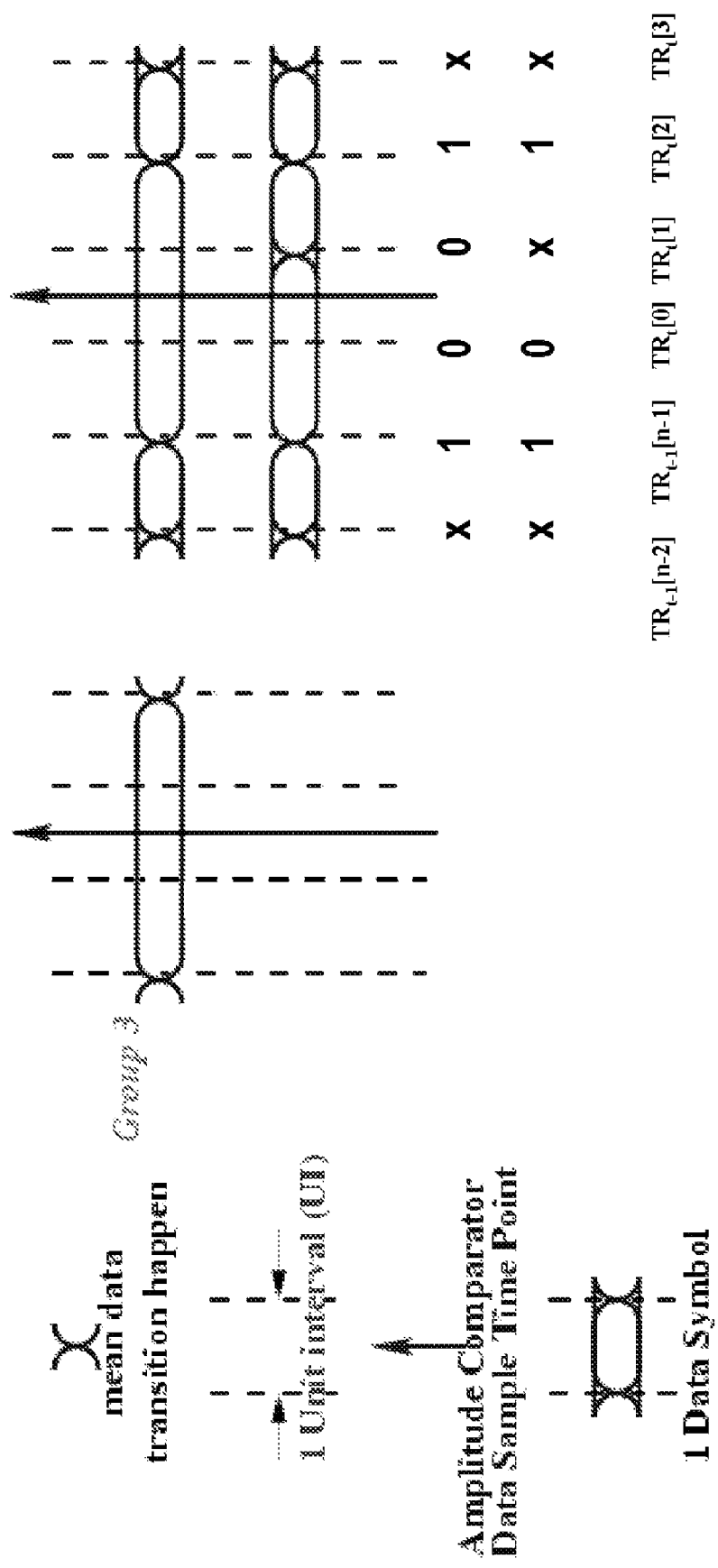
FIG. 14 depicts in a timing diagram data signal patterns that correspond to a third group indicator.
Figure 15:
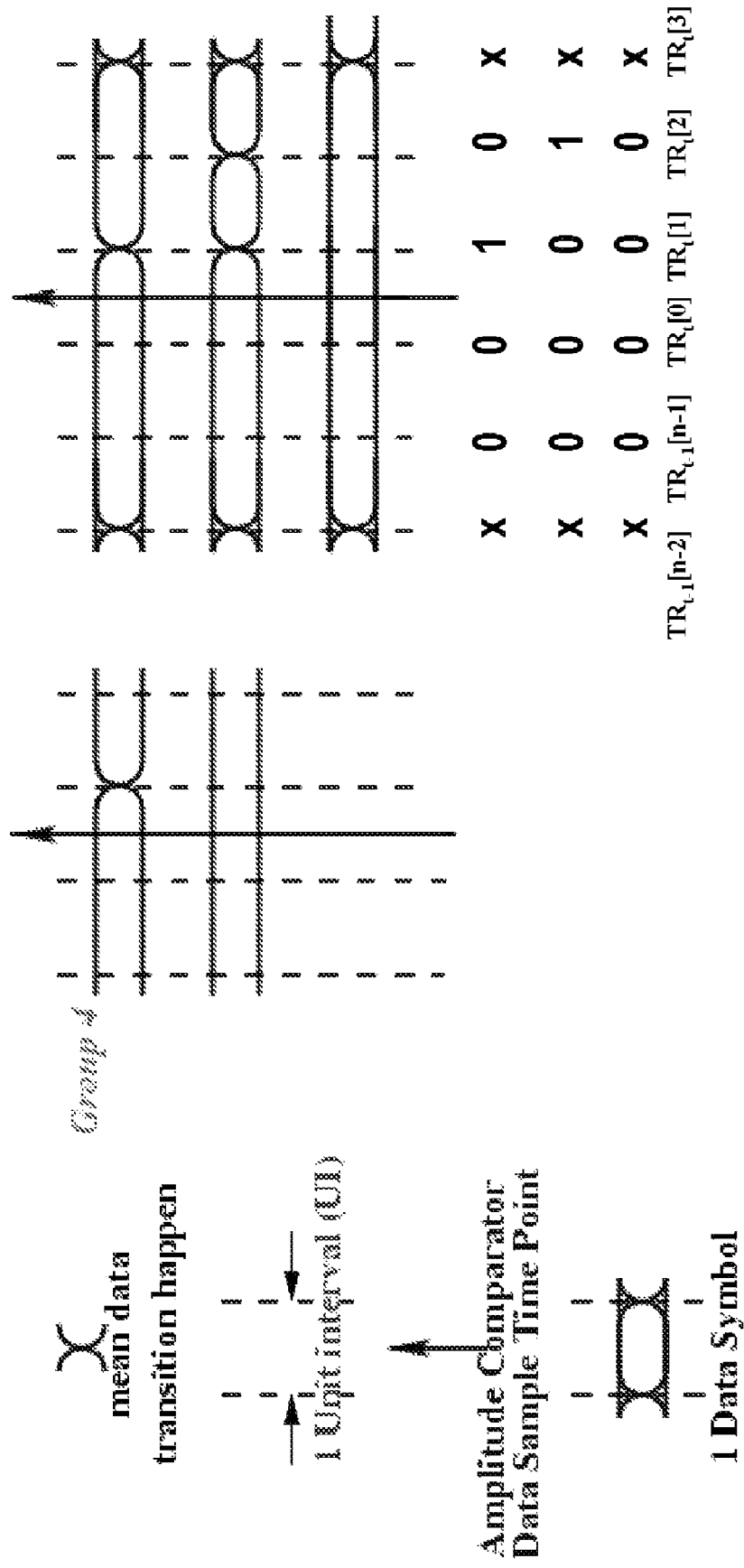
FIG. 15 depicts in a timing diagram data signal patterns that correspond to a fourth group indicator.

FIG. 14 depicts an example for Group 3 patterns. Similarly, FIG. 15 depicts an example for Group 4 patterns.

The pattern indicating Group 1 focuses on the gain peak frequency Fgp. The pattern indicating Group 2 is focused on the maximum gain Gmax. The patterns indicating Groups 3 and 4 focus on the deltaG related pattern. The output of the data pattern match function indicates which accumulator in the data accumulator function should be active. There are three accumulators, one for each of the feedback control signals. These accumulators are cross referenced.

Thus, each of the four patterns is detected by the combination of the XOR operation to identify the toggle bits and a comparison to stored, predetermined patterns in the pattern data match function 92. The output signal Gr is, in this example, a single bit active code, so if Group 1 is identified in the pattern seen at time t, bit 0 from the signal Gr[m−1:0] is set, the others are zero. If Group 2 is identified, bit 1 is set, and bits Gr[m−1:2] and Gr[0] are zero. Similar coding is used to indicate a Group 3 or Group 4 pattern match.

In the data accumulator function 94, the comparator input (or inputs, if two comparators are used) is related to the group pattern match. The comparator input indicates whether the LEQ receiver frequency response combined with the channel frequency response is adequately compensated or not.

Figure 16:
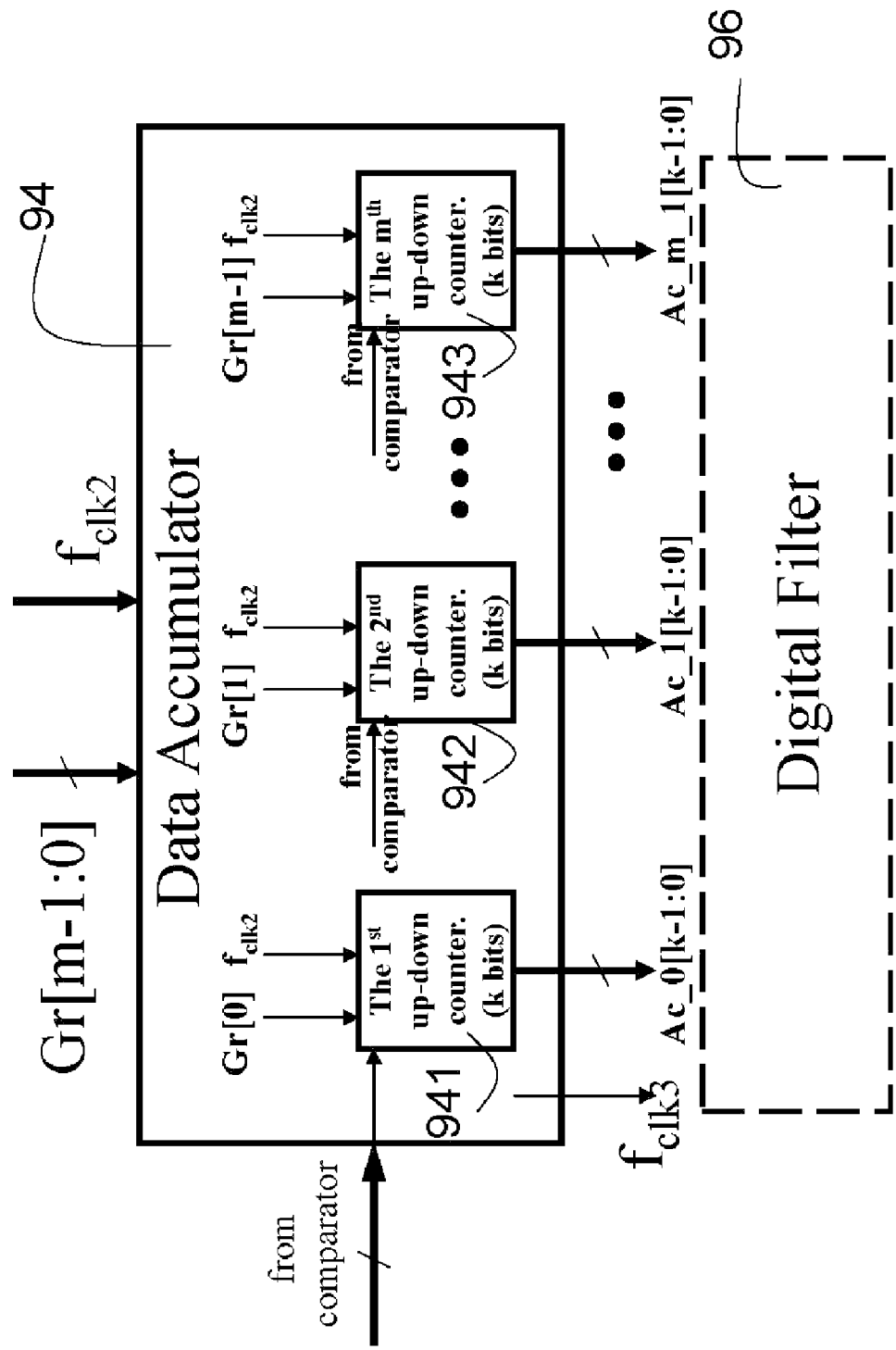
FIG. 16 depicts in a block diagram the functions of the data accumulator of the digital feedback control unit of FIG. 9.

FIG. 16 depicts the internal block diagram of an exemplary implementation of the data accumulator function 94. The data accumulator function receives the group indicator signals Gr and a clock signal fclk2. The data accumulator has m up-down counters, each having "k" bits for the count. These variables allow for flexible designs. For the particular implementation described here, there are 3 up down counters, one for each of the control signals used to control the adaptive LEQ. Therefore, m is 3 in this example. The value of k can be chosen as needed based on the clock frequencies and the design parameters; of course, a lower value for k leads to smaller counters, and therefore less transistors and silicon area for the accumulator function. The comparator input tells the counter, for each clock fclk2 where the corresponding Gr bit is set, whether to count up or count down. The accumulator outputs are in the form of signals Ac_0[k−1:0] . . . Ac_m−1 [k−1:0].

In operation, the up-down counters either subtract 1, or add 1, based on the comparator input at the time. The active up-down counter is chosen by the bit in the group signal Gr that is set. Typically, subtracting one is performed by adding the value 111 . . . 0 to the present count. Adding one is performed by adding 000 . . . 01 to the present count. The counters are preferably implemented with overflow and underflow prevention. That is, when the count is touching an overflow boundary, it will not increment. When the count is touching an underflow boundary, it will not decrement. This prevents an underflow or overflow error in computation, although some information is lost because the count is not changed until the counter value is no longer touching a boundary condition.

Figure 17:
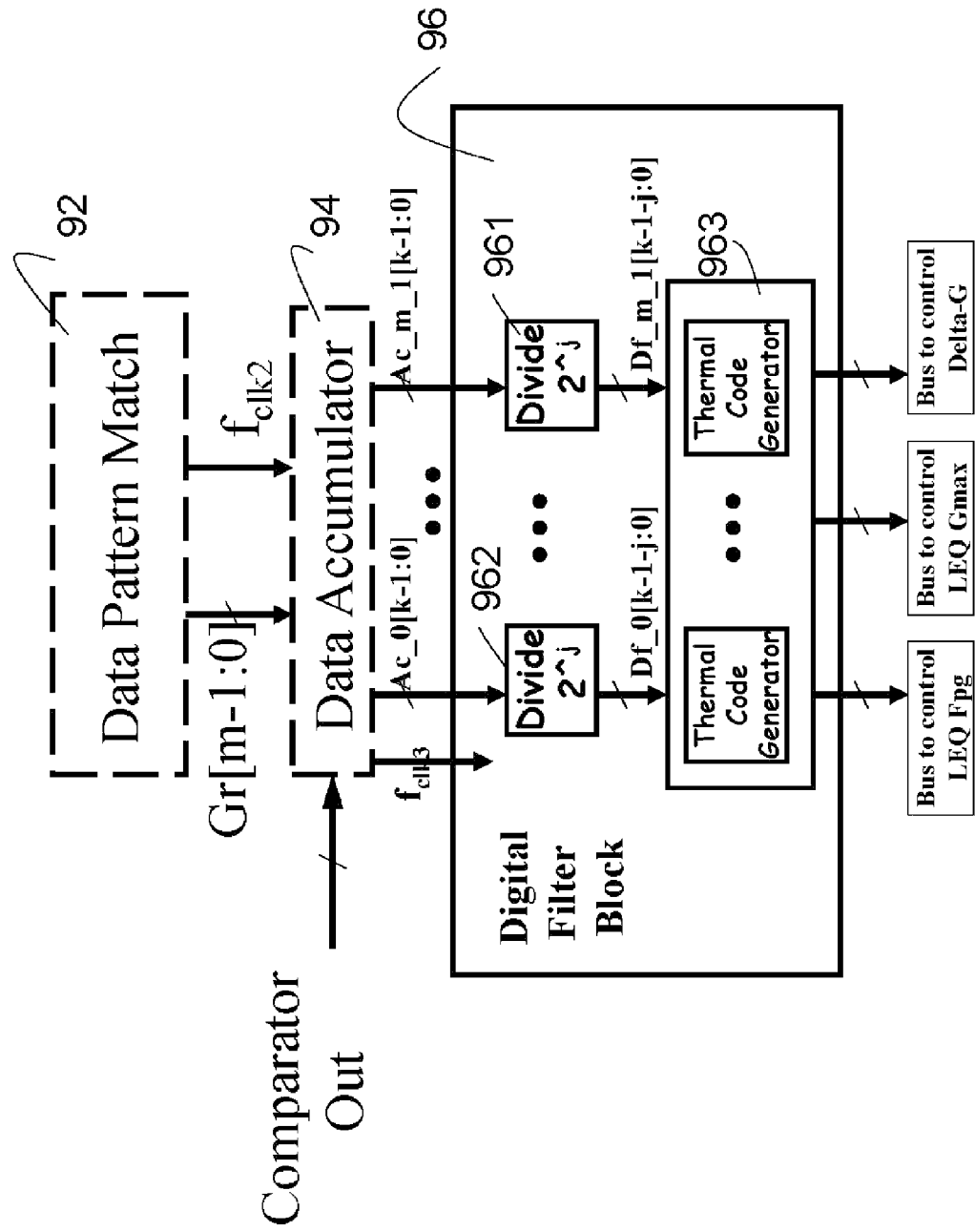
FIG. 17 depicts in a block diagram the functions of the digital filter of the digital feedback control unit of FIG. 9.

FIG. 17 depicts in a block diagram an exemplary implementation of the digital filter function 96. Dividers are used to divide the incoming accumulator values to form a smaller output range. Digital filter signals Df_0 . . . Df_m−1 are formed. Each digital filter signal is essentially the most significant bits (MSBs) of the corresponding accumulator signal Ac[k−1:0] minus "j" bits from the Ac signal. This effectively divides the Ac signal by the value 2 j. Dividers 961 and 962 receive the Ac signals from a corresponding one of the counters in the data accumulator 94 and output the Df signal corresponding to the bits [k−1-j:0]. Then the digital filter converts this Df bus to a thermal code or thermometer code in the block 963. In this illustrative example, there are three feedback control signals; one for LEQ peak frequency, one for LEQ maximum gain Gmax, and one for LEQ delta G. In other example applications, there could be more feedback signals used; there will be a data accumulator, a divider, and a thermal code generator for each output signal used in the feedback control loop.

Figure 18:
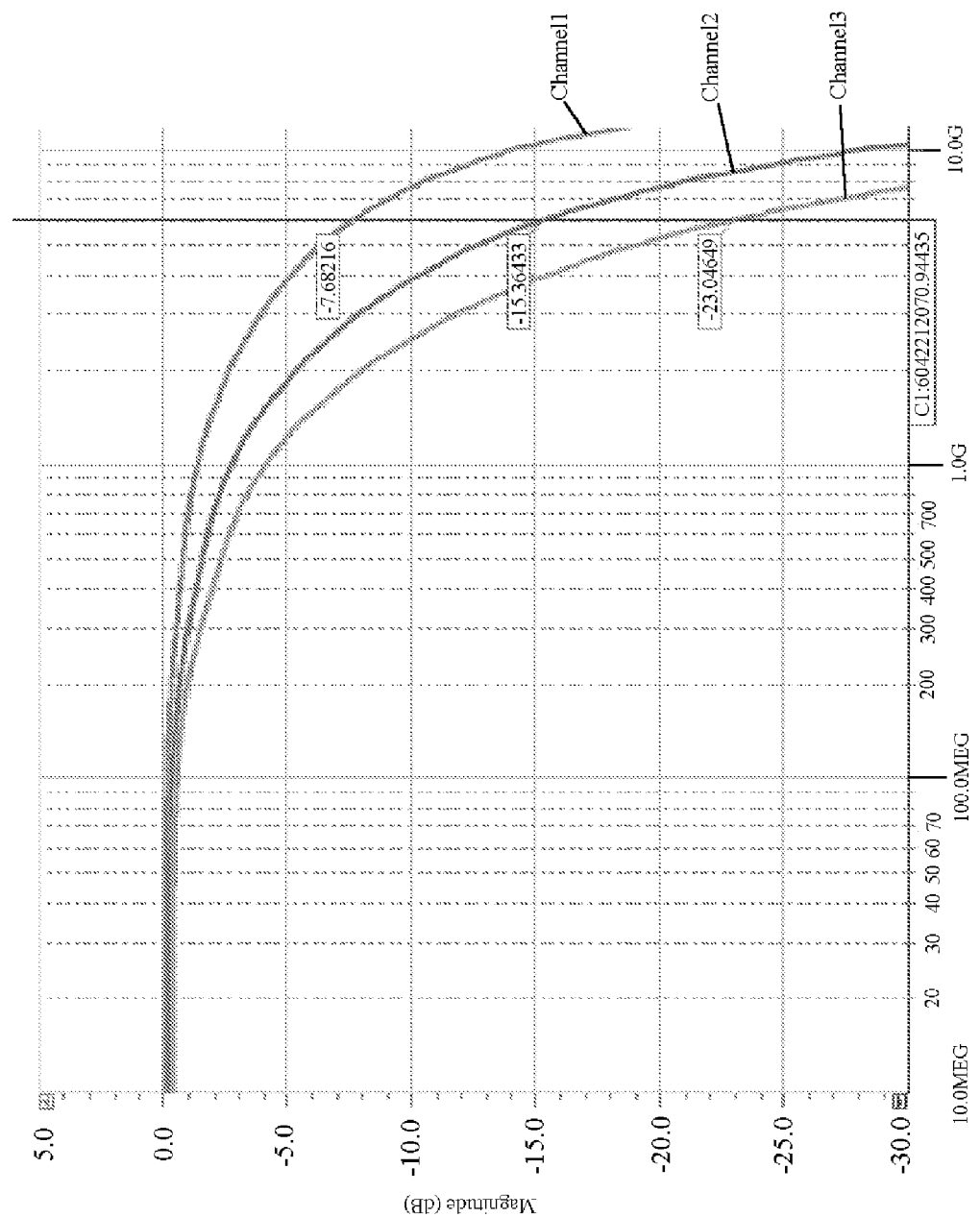
FIG. 18 illustrates in another frequency response curve three channel conditions used in simulations.
Figure 19:
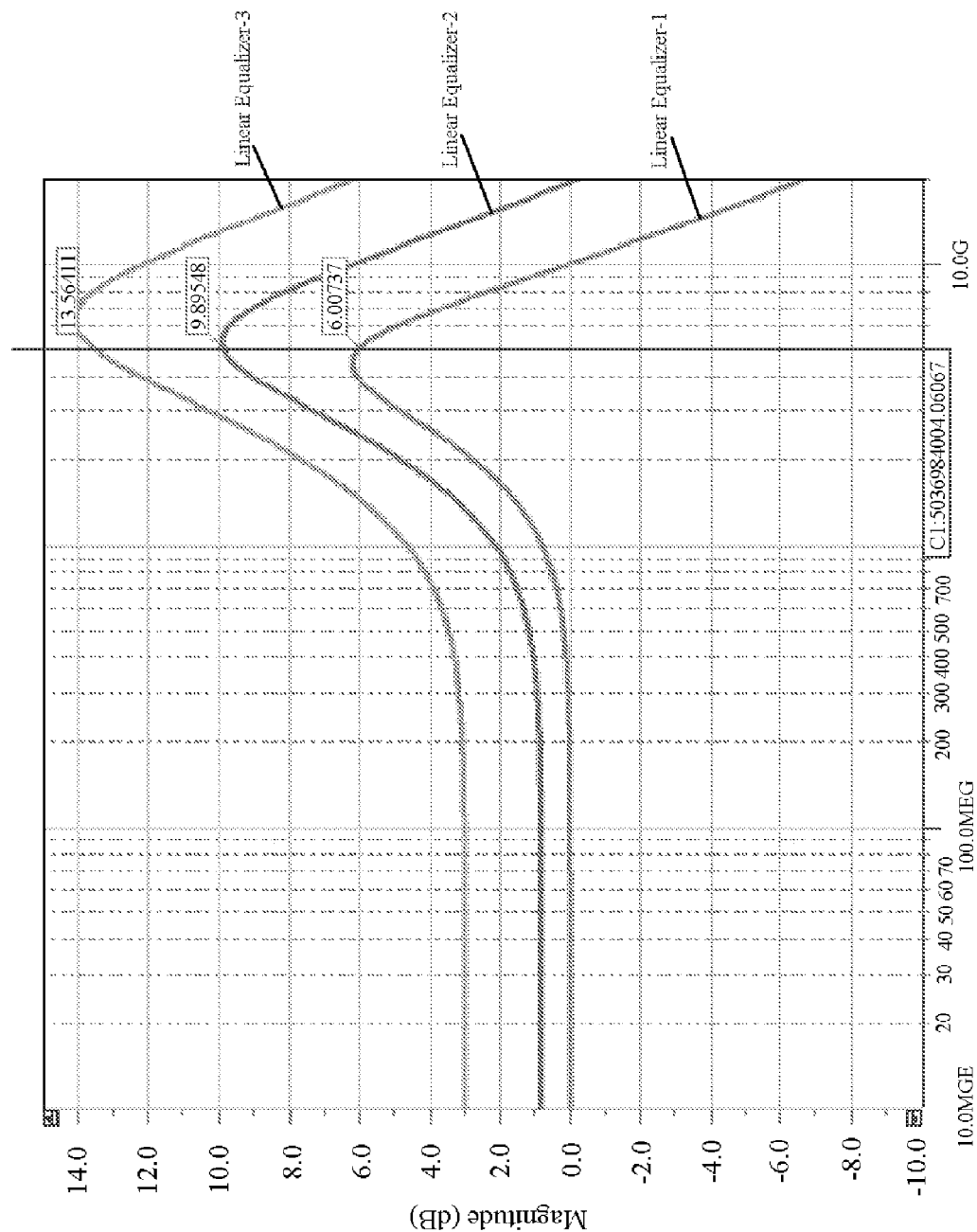
FIG. 19 illustrates in another frequency response curve the response of a linear equalizer utilizing the embodiments of the invention for the three curves of FIG. 18.
Figure 20:
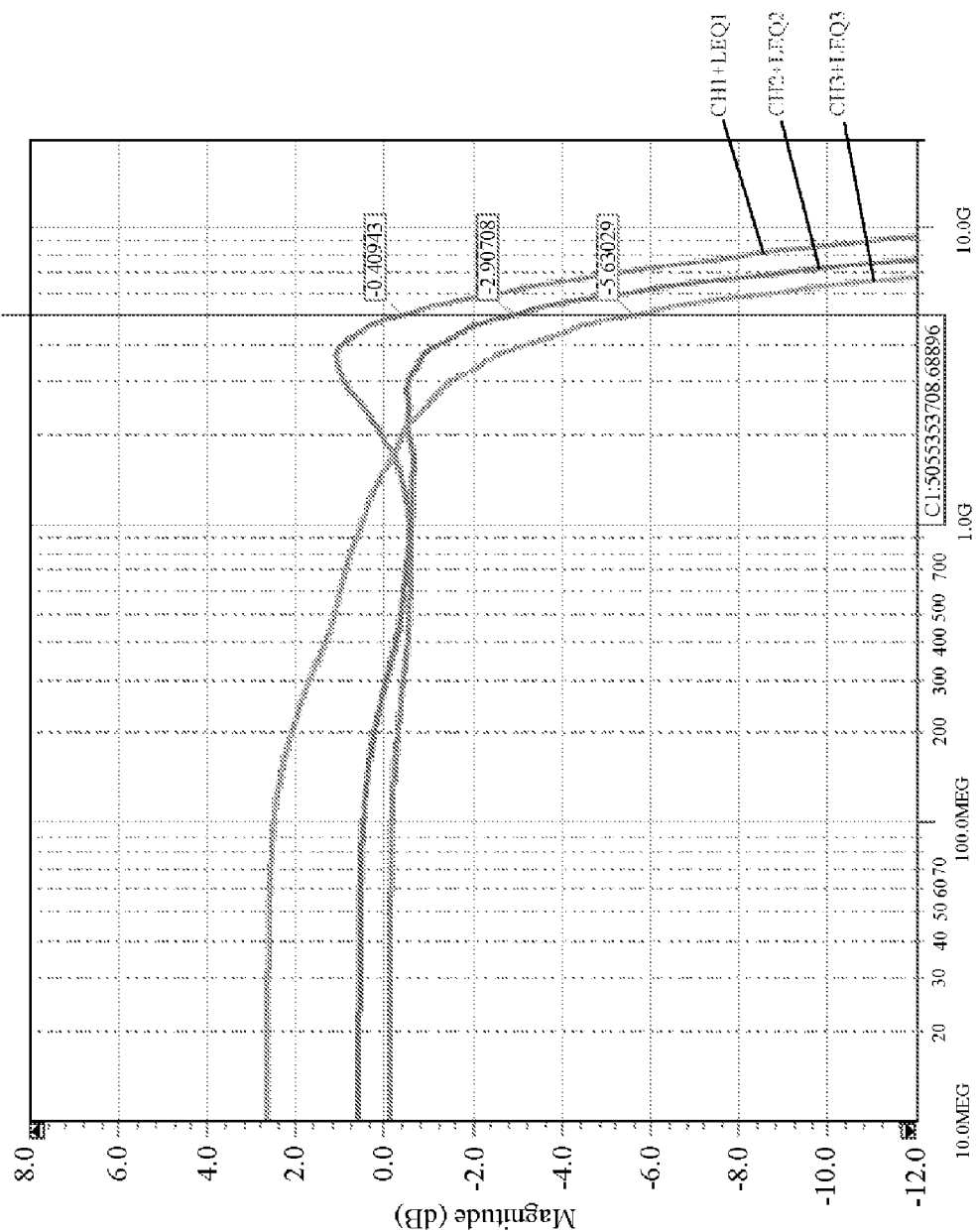
FIG. 20 depicts a combined frequency response graph having a curve for each of the three channel conditions and three linear equalizer simulations of FIGS. 18 and 19.

FIG. 18 depicts in a frequency response plot a simulated exemplary set of three different channel conditions. FIG. 19 depicts from a simulation of an example implementation of the embodiment of FIG. 7, the three receiver LEQ frequency responses the exemplary embodiment feedback circuitry provided. FIG. 20 depicts the combined channel and receiver frequency response plot for each of the three cases. In FIG.

20, the advantages of the use of the embodiments can be seen, the overall frequency response remains flat and the bandwidth is extended for each frequency response to provide a more uniform bandwidth.

Figure 21:
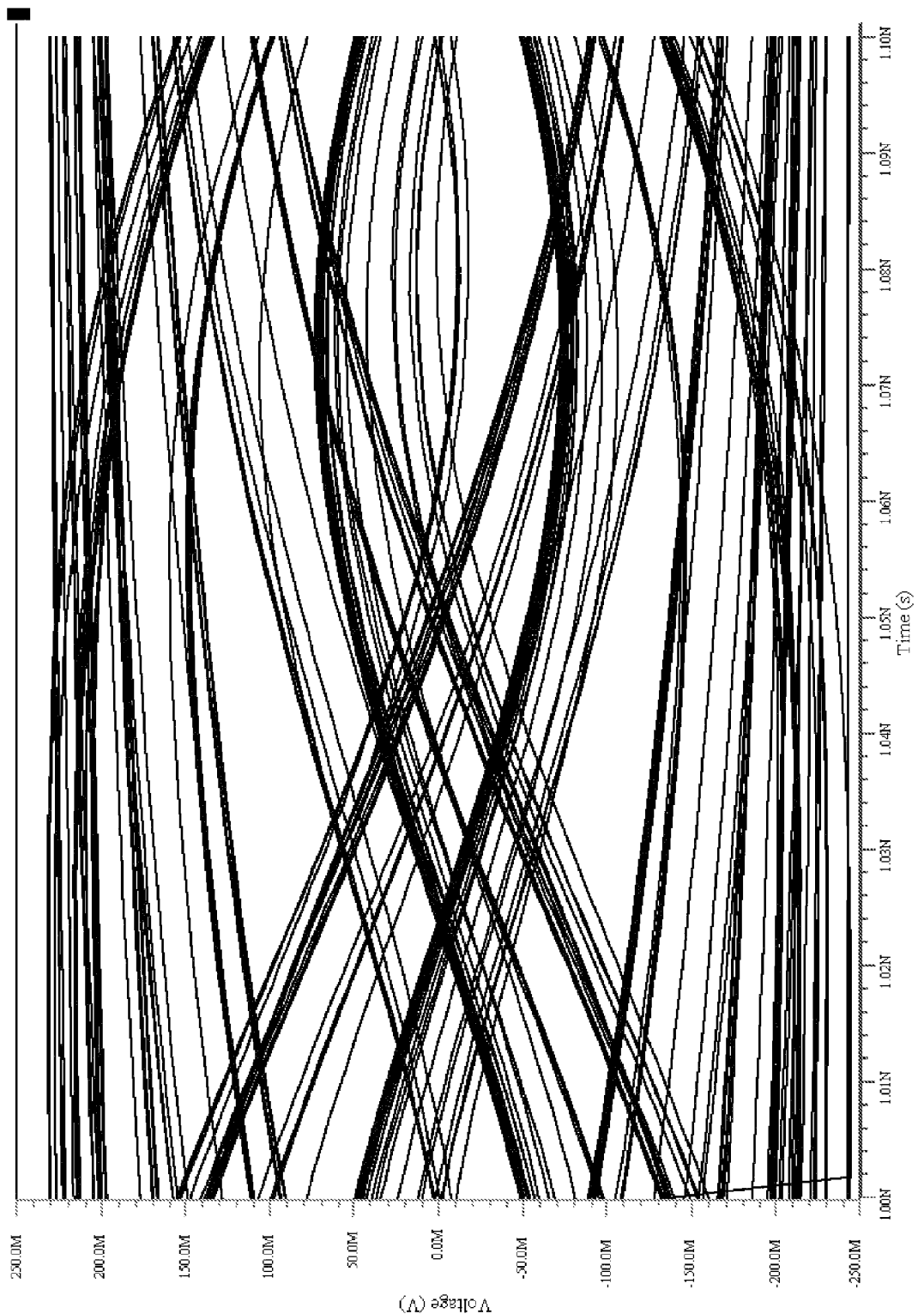
FIG. 21 depicts a signal eye plot obtained without using the embodiments of the invention.
Figure 22:
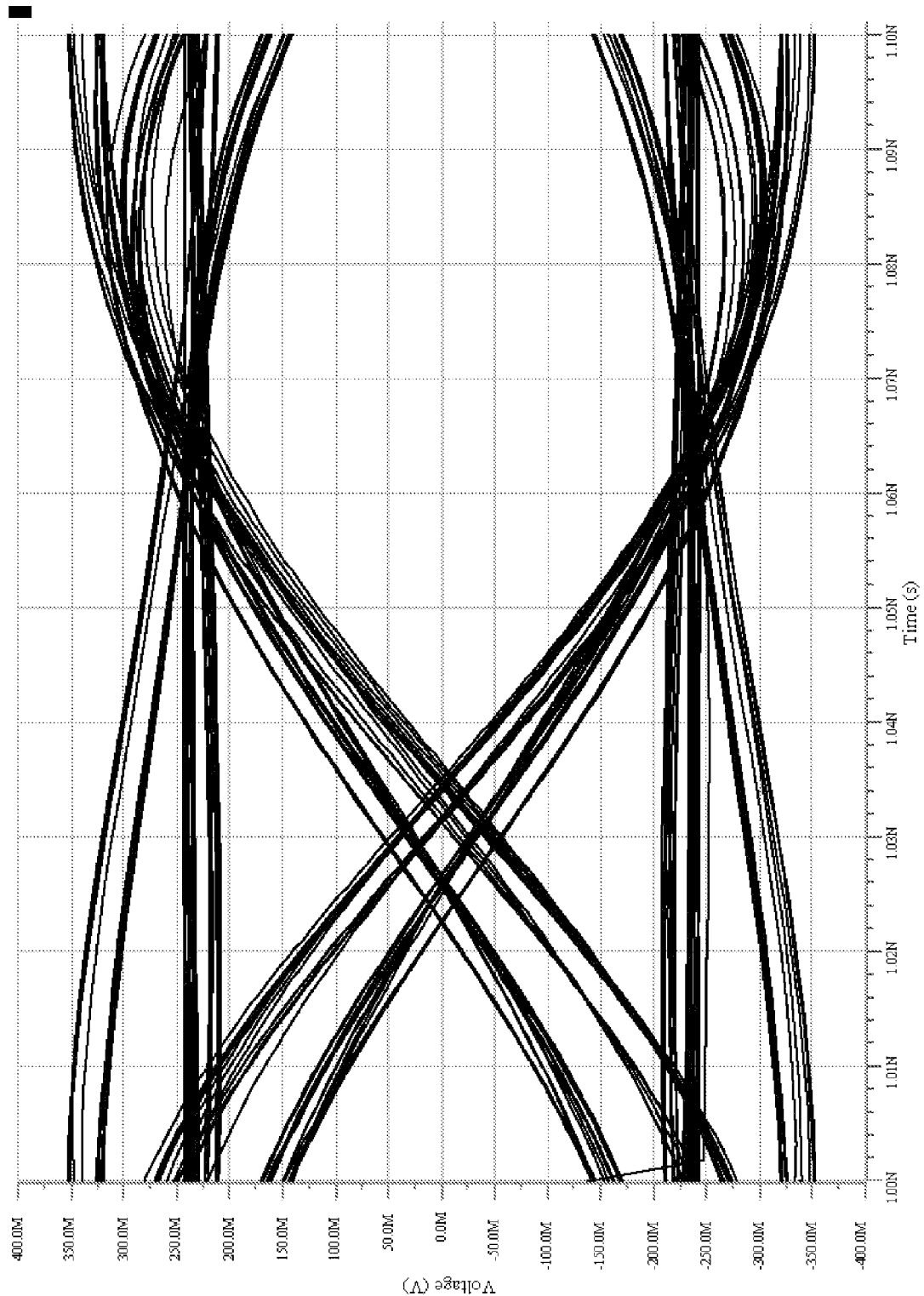
FIG. 22 depicts a signal eye plot obtained for a receiver embodiment of the present invention.

FIGS. 21 and 22 further depict results obtained in a simulation applying an exemplary embodiment of the invention. In FIG. 21, a voltage diagram for signals received is depicted for a receiver without the LEQ of the exemplary embodiments of the invention. In FIG. 22, a voltage diagram is shown for signals received using the adaptive feedback LEQ of embodiments of the invention. As seen in FIG. 22, the signal eye is much improved when the circuits and methods of the embodiments of the present invention are applied.

Although the present invention and its advantages have been described in detail, it should be understood that various changes, substitutions and alterations can be made herein without departing from the spirit and scope of the invention as defined by the appended claims. For example, it will be readily understood by those skilled in the art that the methods may be varied while remaining within the scope of the present invention.

Moreover, the scope of the present application is not intended to be limited to the particular embodiments of the methods and steps described in the specification. As one of ordinary skill in the art will readily appreciate from the disclosure of the present invention, processes, or steps, presently existing or later to be developed, that perform substantially the same function or achieve substantially the same result as the corresponding embodiments described herein may be utilized according to the present invention. Accordingly, the appended claims are intended to include within their scope such processes or steps.

What is claimed is:

1. An apparatus for receiving a differential signal, comprising:
   a receiver coupled to a pair of inputs for receiving a differential signal;
   a linear equalizer for providing frequency compensation to restore losses in the received signal due to transmission by a channel;
   a data recovery circuit coupled to the output of the linear equalizer configured to convert received analog signals to a digital form and to recover data and a received clock signal from the digital form, and having a digital output; and
   a feedback circuit coupled to the digital output and coupled to at least one voltage comparator sampling the output of the linear equalizer, configured to output feedback control signals to modify the frequency response of the linear equalizer responsive to the digital output and the at least one comparator output.

2. The apparatus of claim 1, wherein the linear equalizer further comprises:
   a first input for modifying the peak gain frequency (Fgp) for the linear equalizer;
   a second input for modifying the maximum gain (Gmax) of the linear equalizer; and
   a third input for modifying the gain difference between the maximum gain and the minimum gain (delta G) of the linear equalizer.

3. The apparatus of claim 1, wherein the at least one comparator further comprises:
   a sample and hold amplitude comparator configured to receive the analog output of the linear equalizer and configured to output a signal indicating whether the magnitude of the received signals exceeds a first threshold voltage.

4. The apparatus of claim 3, further comprising:
   at least one additional amplitude sample and hold comparator for receiving the analog output of the linear equalizer and configured to output a signal indicating whether the magnitude of the signals exceeds a second threshold voltage.

5. The apparatus of claim 1, wherein the feedback circuit further comprises:
   a data pattern match circuit configured to output a signal indicating when a digital data output from the data recovery circuit matches a predetermined pattern;
   a data accumulator circuit configured to accumulate data and coupled to the data pattern match circuit and the at least one comparator; and
   a digital filter coupled to the data accumulator circuit configured to output the feedback control signals.

6. The apparatus of claim 5, wherein the data accumulator circuit further comprises:
   a first accumulator configured to perform data accumulation when the data pattern match indicates a pattern related to the peak gain frequency Fgp;
   a second accumulator configured to perform data accumulation when the data pattern match indicates a pattern related to the maximum gain Gmax; and
   a third accumulator configured to perform data accumulation when the data pattern match indicates a pattern related to the gain difference deltaG.

7. The apparatus of claim 1, further comprising:
   a serial in parallel out circuit coupled to the data recovery circuit configured to receive a serial digital data stream and to output parallel data.

8. The apparatus of claim 1, wherein the at least one comparator samples at a rate less than the data clock rate.

9. The apparatus of claim 1, wherein the sample rate is less than ½ the data clock rate.

10. An integrated circuit for receiving serial signals over a differential signal channel link, comprising:
    a pair of inputs for receiving analog differential signals;
    a receiver circuit coupled to the pair of inputs and comprising a linear equalization circuit configured to output signals that are frequency response compensated differential signals, and having at least three control inputs;
    a data recovery circuit coupled to the output of the linear equalizer and configured to convert received analog signals to a digital form, and configured to recover data and a received clock signal from the digital form, and having a digital signal output; and
    a feedback circuit coupled to the digital signal output and coupled to at least one voltage comparator sampling the analog signal output of the linear equalizer, configured to output at least three feedback control signals to modify the frequency response of the linear equalizer responsive to the digital output and the at least one comparator output.

11. The integrated circuit of claim 10, wherein the linear equalizer further comprises:
    a first input for modifying the peak gain frequency (Fgp) for the linear equalizer;
    a second input for modifying the maximum gain (Gmax) of the linear equalizer; and
    a third input for modifying the gain difference between the maximum gain and the minimum gain (delta G) of the linear equalizer.

12. The integrated circuit of claim 10, wherein the at least one voltage comparator further comprises:
    a sample and hold amplitude comparator configured to receive the analog output of the linear equalizer and configured to output a signal indicating whether the magnitude of the received signals exceeds a first threshold voltage.

13. The integrated circuit of claim 10, wherein the feedback circuit further comprises:
    a data pattern match circuit configured to output a signal indicating when a digital data output from the data recovery circuit matches a predetermined pattern;
    a data accumulator circuit configured to accumulate data and coupled to the data pattern match circuit and the at least one comparator; and
    a digital filter coupled to the data accumulator circuit configured to output the feedback control signals.

14. The integrated circuit of claim 13, wherein the data accumulator circuit further comprises:
    a first accumulator configured to perform data accumulation when the data pattern match indicates a pattern related to the peak gain frequency Fgp;
    a second accumulator configured to perform data accumulation when the data pattern match indicates a pattern related to the maximum gain Gmax; and
    a third accumulator configured to perform data accumulation when the data pattern match indicates a pattern related to the gain difference deltaG.

15. The integrated circuit of claim 10, further comprising additional user specified digital logic circuitry for receiving the digital data output by the data recovery circuit.

16. A method for receiving differential signals over a serial channel link, comprising:
    receiving a pair of differential analog signals;
    performing linear equalization to provide analog output signals that are frequency compensated to compensate for signal losses in the channel link;
    performing data recovery to convert the analog output signals to digital form and extracting a clock signal and digital data signals from the analog output signals, and outputting the digital data signals;
    sampling the analog output signals in a first amplitude comparator and outputting a signal indicating when the analog output signals exceeds a predetermined threshold; and
    using feedback, modifying characteristics of the linear equalization to obtain a desired overall frequency response analog output signals.

17. The method of claim 16, wherein using feedback further comprises:
    observing the digital data signals and identifying a pattern and outputting a signal indicating the pattern observed;
    performing data accumulation on the output of the amplitude comparator responsive to the pattern observed; and
    performing digital filtering and outputting control signals to modify the linear equalization.

18. The method of claim 16, wherein modifying characteristics further comprises at least one of:
    modifying the peak gain frequency Fgp of the linear equalization;
    modifying the maximum gain Gmax of the linear equalization; and
    modifying the gain difference between the maximum gain and minimum gain deltaG of the linear equalization.

19. The method of claim 16, further comprising:
    sampling the analog output signals in a second amplitude comparator and outputting a signal indicating when the analog output signals exceeds a second predetermined threshold.

20. The method of claim 16, wherein the sampling is performed at a rate less than ½ the clock signal rate.

* * * * *